March 6, 1928. 1,661,399
W. WISHART
FLUID COMPRESSOR
Filed Jan. 14, 1926
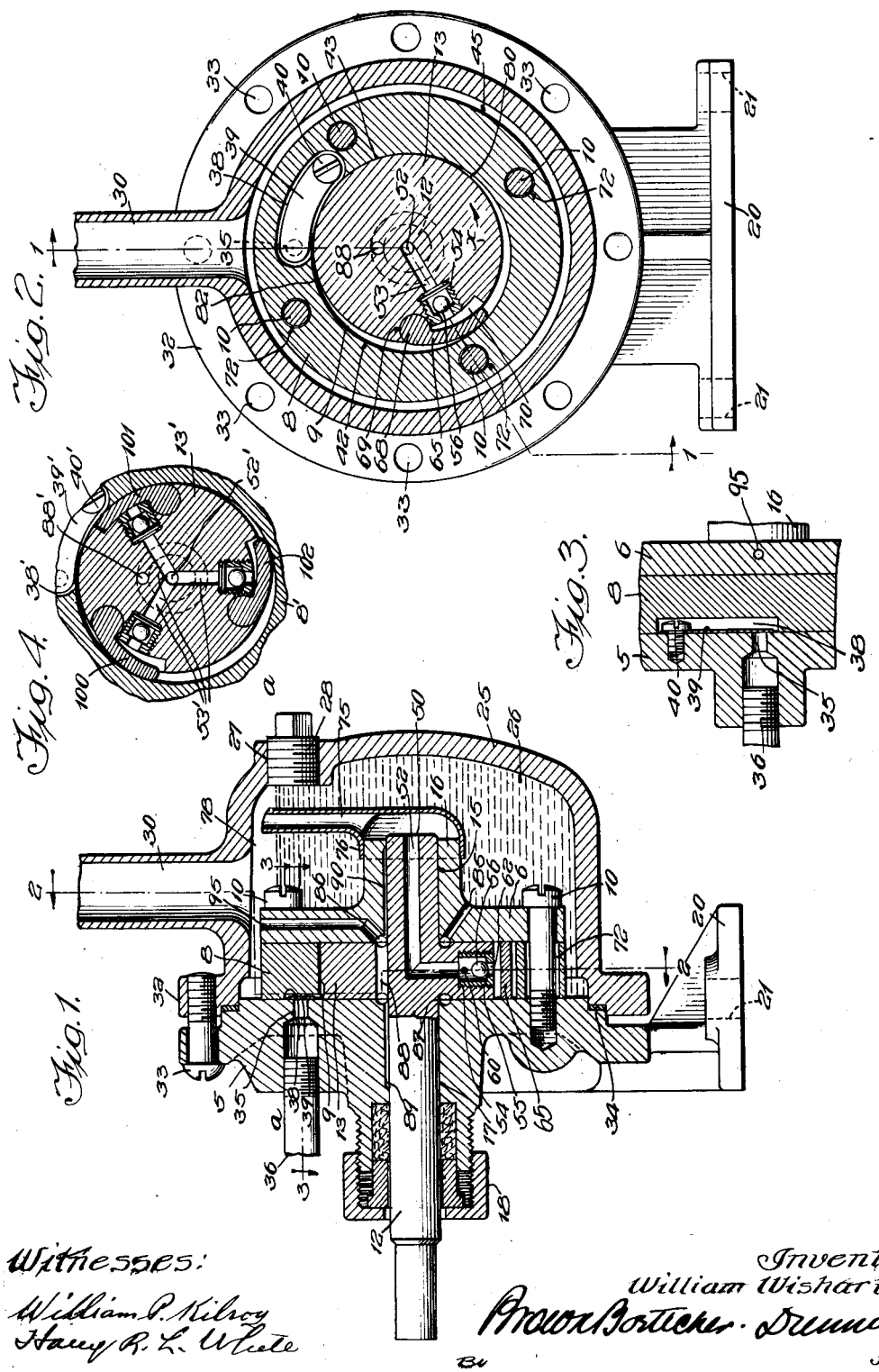

Patented Mar. 6, 1928.

1,661,399

UNITED STATES PATENT OFFICE.

WILLIAM WISHART, OF CLINTON, IOWA, ASSIGNOR TO NATIONAL REFRIGERATION CORPORATION, OF BELOIT, WISCONSIN, A CORPORATION OF DELAWARE.

FLUID COMPRESSOR.

Application filed January 14, 1926. Serial No. 81,177.

My invention relates to fluid compressors.

The compressor of my present invention has particular utility in relatively small or portable refrigerating systems for domestic use, for example. However, the present invention is not limited to any particular use or purpose, but may be employed wherever found suitable or desirable.

Machines of this sort at present must be made with exact precision. One discrepancy may result in improper cooperation between the parts and improper operation of the machine. This must be avoided in making and machining the parts. Once present, it is practically impossible to cure it. Where wear occurs, renewal becomes necessary. Special tooling is also usually required and the matter of proper lubrication presents a difficult problem in the present machines. Considerable hand work is usually required to make the parts tight and to assure proper operation.

For the purpose of permitting the electric driving motor usually employed to bring the compressor from rest up to speed, unloaded, machines of this sort, at present, also require unloading means for holding one or more of the valves unseated, when the apparatus is set in operation, so as to relieve the load on the driving means.

An object of my present invention is to provide a generally improved and simplified machine that can be economically produced with standard tools and without handwork or special tooling.

Another object is to provide a machine which does not require accurate relationing of the parts in construction and a machine in which any inaccuracy may be conveniently taken up in the first assembly and any wear conveniently taken up as desired thereafter expeditiously and without renewal.

Further objects are to improve the lubrication and to eliminate the necessity of the unloading means heretofore required.

To acquaint those skilled in the art with the manner of constructing and operating the compressor of my invention, I shall now describe a particular embodiment of the same in connection with the accompanying drawings, in which:—

Fig. 1 is a sectional view through an embodiment of the invention, taken on the line 1—1 of Fig. 2;

Fig. 2 is a cross section taken on the line 2—2 of Fig. 1;

Fig. 3 is a detail section taken on the line 3—3 of Fig. 1; and

Fig. 4 is a fragmentary section generally similar to Fig. 2 through a modification.

Referring to the drawings, the particular embodiment of the invention selected for illustration comprises an upright vertical external head 5 and an internal head member 6 spaced from the head 5 by a ring member or annulus 8 which defines the compression chamber 9 between the heads 5 and 6. Bolts 10 passing through the head 6, ring member 8, and threaded into the head 5, bind the head member 6 to the head 5 with the ring member 8 clamped firmly between them.

The driving shaft 12 has a rotor 13 preferably formed integral therewith and preferably concentric thereon. The rotor 13 is spaced from the inner end of the shaft 12, extending radially from the shaft 12 and operating between the head members 5 and 6 and within the surrounding ring member 8. The rotor 13 is preferably of a width sufficiently less than the width of the ring member 8 to provide suitable operating clearance between the opposite sides of the rotor and the adjacent or opposing inner surfaces of the head members 5 and 6. Just enough clearance to prevent clamping or binding of the rotor between the head members 5 and 6 will serve this purpose.

One end of the shaft 12 extends through an opening 15 in the head member 6, the head member having an extending hub or boss 16. The opposite end of the shaft 12 extends out through an opening or bore 17 in the head member 5 for suitable connection with the electric driving motor or other source of driving effort. The opening 17 through which the shaft 12 extends out externally of the machine may be suitably sealed against leakage by packing and gland means 18.

The head member 5 may have an integral pedestal or base 20 which may be adapted at 21 for bolting upon the slab or other support.

The inner end of the shaft 12 and the head member 6, ring 8 and rotor 13 are all enclosed in a housing or cover 25, which preferably holds a body of lubricant 26 about these parts up to the line a—a (Fig. 1). The housing 25 may have a charging opening 27 closed by a removable plug 28 and a discharge tube 30 leads from the space above the oil level a—a in the housing 25. The discharge tube 30 conveys the compressed fluid from the compressor to the point to which it is to be supplied. In the case of a refrigerating system, the compressed refrigerant may be conveyed by the tube 30 to the condenser of the system, for example.

The open end of the housing or shell 25 has an annular flange 32 and screws 33 extending through the head member 5 and threaded into the flange 32 bind or clamp the housing 25 firmly to the head member 5. The joint between the housing and member 5 is preferably sealed by a suitable gasket 34.

The inlet or admission port 35 with which the inlet line 36 is connected, opens through the head member 5 into an arcuate pocket 38 in the adjacent surface of the ring member 8. The port 35 has a flap valve 39 which lies within the pocket 38 and may conform generally therewith. The valve 39 is secured at one end as by means of a screw 40 to the head member 5, and its opposite end overlies the port 35 and is free to be drawn therefrom and to close thereover.

The inner surface 42 of the ring 8 is disposed eccentrically around the rotor 13 and contacts or engages the periphery of the rotor 13 at 43. The circular interior surface or opening 42 in the ring 8 may be eccentrically disposed with respect to the periphery 45 of the ring. This makes the ring 8 thicker along the inlet port and pocket to amply accommodate the same without unnecessarily increasing the thickness of the entire ring and, at the same time, the eccentric disposal of the interior of the ring 8 and its contact with the rotor at 43 may be secured without undue eccentricity of the ring in the housing or reservoir 25.

The outlet 50 of the machine comprises a passageway 52 disposed in the inner housed end of the shaft 12, opening axially at one end from the inner end of the shaft 12 and at its opposite end opening radially at 53 through the rotor 13 by way of a sleeve 54 threaded radially into the rotor. The sleeve 54 has a seat 55 for a ball check valve 56 which is free to play between said seat 55 and a stop 60, which may comprise a diametrical wire or pin mounted in the sleeve 54. The stop 60 limits the movement of the check valve inwardly, and at the limit of its outward movement, said check valve 56 seats and closes the port 62.

The compression member or piston element 65 comprises an arm or blade, the width of which is substantially equal to the width of the rotor 13. At one end the piston element 65 has a cylindrical knuckle 68 extending between the head members 5 and 6 and swingably secured in a corresponding socket or recess 69 in the periphery of the rotor 13. The periphery of the rotor 13 is scarfed or notched at 70 to form a pocket which extends peripherally from the socket 69 in the direction of rotation of the rotor and receives the piston element 65 as it is swung inwardly in the rotation of the rotor. The pocket 70 just accommodates the piston element 65 at the limit of its inward movement and the piston element in that position substantially fills the pocket with its outer periphery conforming with the periphery of the rotor 13. The arc of the outer periphery of the piston element 65 is substantially the same as the curvature of the periphery of the rotor 13 so that when the piston element is in the pocket 70, the circular periphery of the rotor will be uninterrupted.

It should be noted that the openings 72 in the ring member 8 through which the bolts 10 extend, are larger than the bolts 10. This permits adjustment of the ring member 8 on the bolts 10 to bring the ring member into proper contact with the rotor at 43 in the first assembly and in spite of variations. This also provides an expeditious adjustment for wear. In the use of the device, as the rotor 13 and ring 8 wear at the point of engagement or contact at 43, due to the rotation of the rotor within the relatively stationary ring, all that is necessary from time to time, is to unloosen the bolts 10, move the ring 8 into proper engagement with the rotor to take up any undesirable clearance at the point of contact 43, and to then tighten up the bolts 10 to bind the ring 8 firmly in adjusted position.

The compressed fluid is delivered from the outlet 52 to the space 78 above the level of the lubricant 26 by a discharge tube 75. This tube is in the form of a standpipe having an enlarged laterally opening lower end 76 fitting snugly over the hub or boss 16 and having its upper end extending up above the level of the lubricant 26 and delivering to the space 78 from where the compressed fluid is discharged or delivered by the tube 30.

From the foregoing, it will now be apparent that the eccentric disposition of the inner surface 42 of the ring 8 with respect to the periphery of the rotor 13, forms a generally crescent-shaped compression chamber 9 between the rotor and ring 8 and of a width corresponding to the distance between the head members 5 and 6. The contact 43 may be properly positioned in the initial assembly and maintained as desired by the adjustability of the ring member 8.

From the foregoing, it will now be apparent that the eccentric disposition of the inner surface 42 of the ring 8 with respect to the external periphery of the rotor 13 forms a crescent-shaped compression chamber 9, the section or volumetric capacity of which increases from the opposite ends to the intermediate part of the chamber as viewed in Fig. 2. The contact or engagement at 43 between the rotor 13 and the surrounding cylinder ring 8 separates the restricted pressure at 80 from the restricted inlet end 82. This contact or engagement 43 is positioned ahead of the inlet pocket 38, in the direction of rotation of the rotor 13, which is indicated by the arrow $x$ in Fig. 2, and thereby closes off the pressure end 80 and separates it from the inlet pocket 38.

The piston element 65 and all other moving parts are carried by and rotate as a unit with the shaft 12. The concentric disposition of the rotor 13 on the shaft 12 balances it thereon, and in starting position the entire moving system is balanced. As the rotor begins to turn upon starting the compressor, centrifugal force throws the piston member 65 as it leaves its contact 43 with the cylinder ring 8 out into engagement with the inner surface 42 of the ring 8 and it remains out in engagement with the ring 8 in its entire movement through the compression chamber and also when it is forced back into the pocket 70, in which position it forms a part of the periphery of the rotor.

It will be apparent that the compressor is not loaded and does not start compressing until the speed of the rotor is sufficient to throw the piston out into compressing engagement with the ring member 8 and that this engagement and the compressing effort is thereby at least partially a function of the speed of the compressor. Unloading devices for permitting the driving motor to bring the compressor up to speed without unduly taxing the motor, which is undesirable, as well understood in the art, are thus avoided. The device is self-unloading and self-loading. The compressor does not immediately load in the initial slow rotation of the compressor and not until the compressor comes up to speed, and then it loads itself.

Any pressure accumulation between the ball check valve 56 and the piston member 65, when said piston member is positioned in the pocket 70, will also assist in positively throwing the piston member 65 out into compressing engagement with the ring member 8. This pressure assists in positively opening the piston member 65, and in swinging it out to loaded compressing engagement with the surrounding cylinder ring.

The ball check valve 56 is also thrown out by centrifugal action into engagement with its seat 55, thereby offering at all times a resistance to the discharge from the pressure side of the piston element 65. As the pressure in the outlet or discharge line beyond the valve 56 fills up, that pressure forces the valve 56 firmly upon its seat and positively checks any back flow into the compression chamber.

The rotor and the piston element or compressing member are preferably formed of hardened steel, although the particular material of these and the other parts may be varied, as desired.

The operation of the embodiment of the invention shown and described, is as follows:—

Assuming that the inlet 35 is properly connected with the supply line from which the fluid to be compressed is delivered and that the outlet 30 is suitably connected to the line for receiving the compressed fluid, upon starting the compressor, the shaft 12 and rotor 13 turn as a unit and the piston element 65 and other movable parts also turn or revolve as a unit therewith.

The compressor remains unloaded until it comes up to speed, whereupon the centrifugal action holds the piston element 65 out with sufficient force that it starts to compress the working fluid. As the piston 65 leaves the contact point 43 and passes the inlet 38, the valve 39 is drawn open and the working fluid drawn in through the pocket 38 into the restricted end 82 of the chamber 9 which communicates with the pocket 38. The piston 65 moving with the rotor 13 forces the working fluid in the chamber 9 ahead of it in its direction of rotation toward the opposite restricted end 80, compressing this working fluid between the pressure end 80 of the chamber 9 and the approaching piston 65 and forcing the compressed fluid out past the valve 56 and through the passage 52 and outlet 75 through the discharge tube 30 to the line or other points to which the compressed fluid is supplied.

As soon as the piston 65 leaves the contact point 43 and passes the inlet 38, it is positively held open by the pressure ahead of it and the suction behind it, the space behind the piston being continuously charged while the fluid ahead of the piston is continuously compressed in the compressing operation of the machine. As soon as the piston leaves the contact 43, it is also thrown outwardly by centrifugal action.

The amount of contact between the rotor 13 and the surrounding ring 8 may be as desired, and the particular position of this contact in the cycle of operation of the rotor may be adjusted as desired, by loosening the bolts 10, slipping the ring 8 into the desired position and again tightening the bolts 10.

The balanced system provided is highly advantageous and important in high speed machines of this sort. The tube 75 delivers the compressed fluid up above the body of oil 26 and prevents foaming or blowing through the oil.

For the purpose of lubricating the parts, a passage 85 opens from the body of lubricant 26 into an annular passage 86 between the rotor 13 and the head member 6. A second annular passage 87 between the rotor 13 and the head member 5 communicates with the passage 86 by means of a longitudinal passage 88 through the rotor 13. Leading longitudinally from the passage 87 is a passage 89 for lubricating the bearing of the shaft 12 in the head member 5. A passage 90 leading longitudinally in the opposite direction from the passage 86 supplies lubricant to the bearing of the shaft 12 in the head member 6.

From the foregoing, it will now be apparent that the housing 25 forms a reservoir for holding a body of lubricant about the parts of the machine. The lubricant is in the high or pressure side of the machine and it is positively forced by the pressure above the surface of its level $a$—$a$ in the discharge line, through the passages 85, 86, 87, 88, 89 and 90. The body of lubricant effectively seals the parts and the rotating member carries the lubricant out and places a lubricant film on the cooperating surfaces of the rotor 13 and head members 5 and 6. The lubricant also follows up through the compression chamber 9 and into the inlet 38, placing a lubricant film on the internal surfaces of the chamber 9 and upon the surfaces of the rotor 13. The self-feeding lubrication thus provided reduces friction and wear, and the machine is thus self-loading and unloading and self-lubricating.

A passage 95 leading vertically from the annular passage 86 extends up through the head member 6 and opens above the oil level $a$—$a$. This passage forms, in effect, a vent for contaminated lubricant and tends, at least partially, to create a lubricant circulation between the parts.

The particular embodiment of the invention described is especially suitable for compressing gaseous fluids, but the embodiment of its features in a liquid pump is contemplated.

Also, the invention is of course not limited to a single piston compressor or pump. A plurality of pistons 100, 101 and 102 may be employed with valve passageways 53' leading to the outlet 52' as illustrated in Fig. 4. In this case the rotor is shown as 13', the inlet pocket at 38' with its valve 39' and the lubricant passageway at 88'. Where more than one piston is desired, any number or combination of pistons may be employed.

I do not intend to be limited to the precise details shown or described.

I claim:—

1. In a compressor, the combination of a pair of relatively movable members spaced peripherally to define a compression chamber and engaging peripherally to form one end of said chamber, and a piston member carried by one of said first members and movable with said member past the engagement of said member from one side of said engagement to the other continuously in the operation of the compressor, one of said members being positively adjustable to vary the point of engagement therebetween.

2. In a device of the class described, the combination of a rotor, a surrounding cylinder ring spaced from said rotor to form a compression chamber and cooperating with said rotor to form one end of said chamber, said ring being adjustable in a direction intersecting the periphery of the rotor to take up wear and to vary the point of contact between it and the rotor.

3. In a rotary compressor, an adjustable stationary cylinder ring having an opening, a rotor mounted for rotation in said opening, the inner opening defining surface of said ring being eccentric with respect to the periphery of the rotor with a compression chamber between them and engaging the periphery of the rotor to form one of the ends of said compression chamber, and a plurality of piston members swingably mounted upon the rotor, said piston members having wiping contact with the inner surface of the stationary ring and movable past the contact between the ring and rotor from one side of said contact to the other continuously in the operation of the compressor.

4. In combination, a rotor, an adjustable stationary ring member surrounding the rotor with its inner surface eccentric with respect to the periphery of the rotor and forming a compression chamber therebetween, the inner surface of said ring member having direct surface contact with the periphery of the rotor to form one of the ends of the compression chamber, a piston member swingably mounted upon the rotor and having wiping contact with the interior of said ring member, said piston member compressing the contents of the compression chamber circumferentially toward the contact between the rotor and ring member by the relative rotation therebetween, an inlet to the compression chamber through the stationary surrounding ring and an outlet leading from said chamber through the rotor.

5. In a compressor, the combination of a rotor, a stationary cylindrical member surrounding said rotor, said member being spaced peripherally from the rotor to form a compression chamber therebetween and having direct contact with the periphery of the rotor to form one end of said compression chamber and a piston member swingably mounted upon said rotor and operable through said chamber past the contact between the cylinder member and the rotor from one side of said contact to the other, said stationary member being capable of positive adjustment to vary the point of said contact.

6. In a compressor, the combination of a rotor, a stationary ring member surrounding the rotor with its inner surface eccentric with respect to the periphery of the rotor and forming a compression chamber therewith, the inner surface of said ring member having direct surface contact with the periphery of the rotor to form one of the ends of the compression chamber, and a piston member swingably mounted upon the rotor and having wiping contact with the interior of the ring member, said piston member compressing the contents of the compression chamber circumferentially by the relative rotation between the rotor and ring member, said ring member having means associated therewith for positively adjusting the same to vary the position of the point of contact between said rotor and ring.

In witness whereof, I hereunto subscribe my name this 11th day of January, 1926.

WILLIAM WISHART.